Sept. 17, 1963

P. J. KIRCHER 3,103,872

COFFEE BASKET ASSEMBLY

Filed Sept. 22, 1960

INVENTOR.
PAUL J. KIRCHER

BY

*Lindsey, Prutzman and Hayes*
ATTORNEYS 3,103,872
COFFEE BASKET ASSEMBLY
Paul J. Kircher, Plainville, Conn., assignor to Landers, Frary & Clark, New Britain, Conn., a corporation of Connecticut
Filed Sept. 22, 1960, Ser. No. 57,727
9 Claims. (Cl. 99—275)

The present invention relates generally to coffee makers and has particular reference to an instant coffee basket assembly for use therein.

It is an object of the invention to provide a new and improved coffee basket assembly which enables conventional coffee percolator pots to be used to properly brew instant coffee.

Another object of the invention is to provide such a basket assembly in which instant coffee grounds and water are retained and mixed prior to being automatically discharged as an instant coffee concentrate for final brewing in the coffee maker receptacle.

Another object of the invention is to provide such a basket assembly which not only automatically releases the instant coffee concentrate but also automatically resets for the next brewing operation.

It is an aim of the invention to provide such a coffee basket which is economically fabricated from a minimum of parts, is durable and easy to use, and is readily insertable and removable from the coffee maker to accommodate convertability of the coffee maker from one in which regular coffee is brewed to one in which instant coffee is brewed and vice versa.

Other objects will be in part obvious and in part pointed out more in detail hereinafter.

The invention accordingly consists in the features of construction, combination of elements and arrangement of parts which will be exemplified in the construction hereafter set forth and the scope of the invention which will be indicated in the appended claims.

Figure 1:
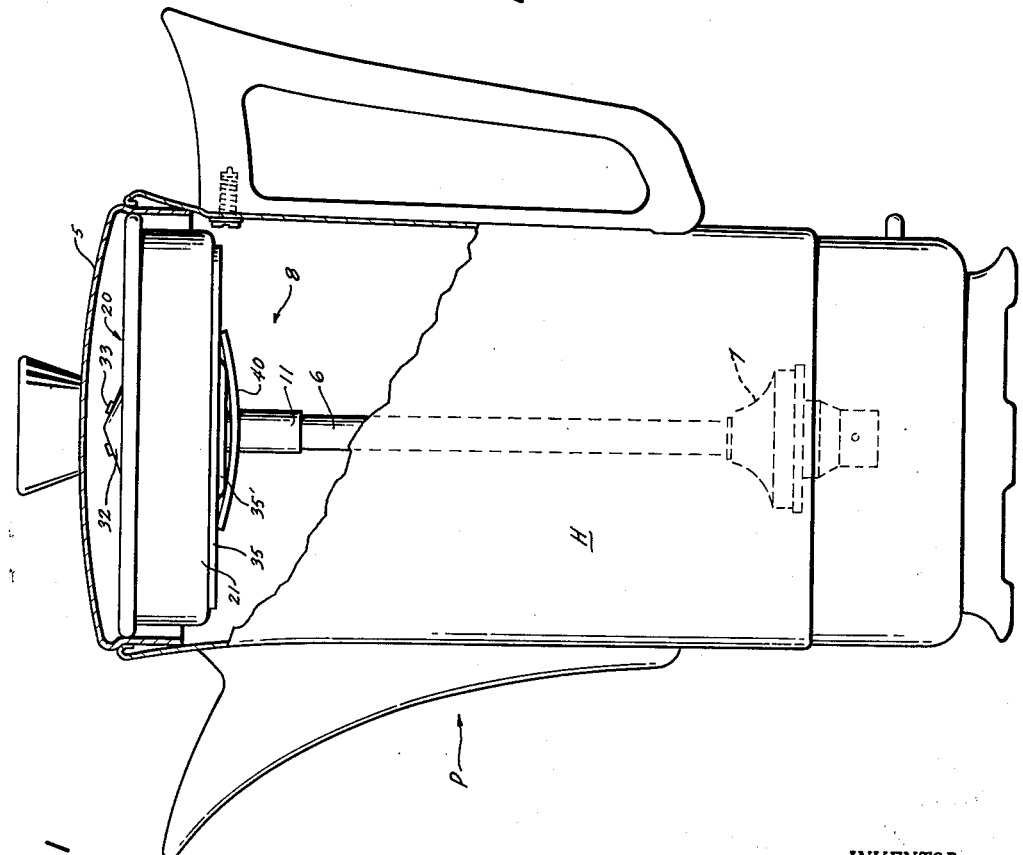
FIG. 1 is a side elevational view of a coffee percolator partially broken away to show an instant coffee basket assembly.

The electric coffee percolator P of FIG. 1 comprises a conventional brew or liquid receptacle H having an open top, normally closed by a conventional cover 5. A percolator fountain tube 6 is vertically disposed in the receptacle H and is provided with the usual water pump 7 (shown in dotted lines only in FIG. 1) at its lower end where it is mounted adjacent the lower portions of the receptacle H.

In the preferred embodiment of the invention, the percolator fountain tube 6 is an integral part of the basket assembly 8 and its vertical path is continued adjacent the upper portions of the receptacle H by upper and lower tube segments 9 and 10, which mount the basket 20 of the assembly 8 and to which it is joined by a bushing 11 which secures the opposing ends of the fountain tube 6 and lower tube segment 9.

The instant coffee basket 20 of the assembly 8 is a cup-shaped container substantially dimensioned to receive a sufficient amount of water to dissolve the maximum required amount of instant coffee material for the coffee maker P. It provides a cylindrical wall 21 and a floor 22 preferably perforated as at 22' but which may be otherwise apertured to permit liquid passage therethrough. The floor 22 is formed with a preferably centrally located opening as at 23 where it is secured to the lower and upper tube segments 9 and 10 between their opposing, radially flanged ends 16 and 17, respectively. Single corrugation grooves 24 and 25 are formed in the tube segments 9 and 10, respectively, adjacent the flanged edges 16 and 17 to receive and support the inner circular edges of lower and upper annular retainer disks 27 and 28. The lower disk 27 provides a pair of tabs 29, oppositely disposed at the outer edges thereof, which pass upwardly through tab slots 30 in the floor 22 and which are bent inwardly to overlie the upper disk 28 at its outer circular edge to restrain the basket 20 and the tube segments 9 and 10 in assembly.

Figure 2:
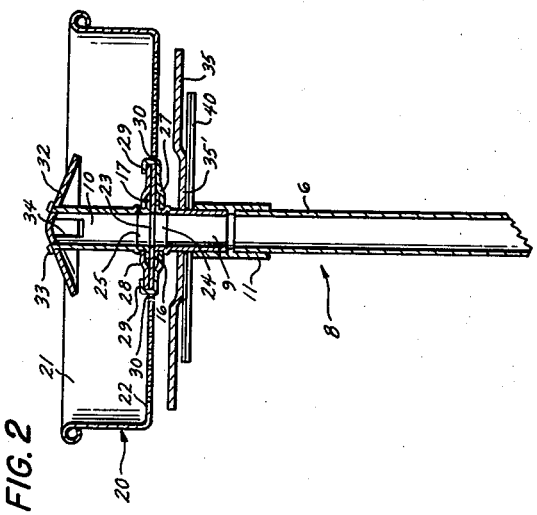
FIG. 2 is a vertcial cross sectional view partially broken away of the instant coffee basket assembly of FIG. 1 showing the assembly in the open, or discharge position and taken through the vertical center line thereof.

The upper tube segment 10 of the basket assembly 8 extends upwardly slightly above the top edge of the basket 20 where a pair of oppositely disposed tabs 33 extend from the upper edges of the upper tube segment 10 and are bent outwardly to secure a conically shaped and downwardly opening deflector head 32. Disposed between the opposing tabs 33 on either side of the upper edge of the upper tube segment 10 are U-shaped cut-out portions or ports 34 (only one of which is shown in FIG. 2) which open radially and cooperate with the deflector head 32 in discharging the water in opposite radial directions downwardly thereof. This action will tend to force the water and instant coffee material (not shown) to circulate within the basket where they are retained in a manner to be described. The continued discharge of water will result in a natural mixing of the grounds and water to form an instant coffee liquid concentrate.

Figure 3:
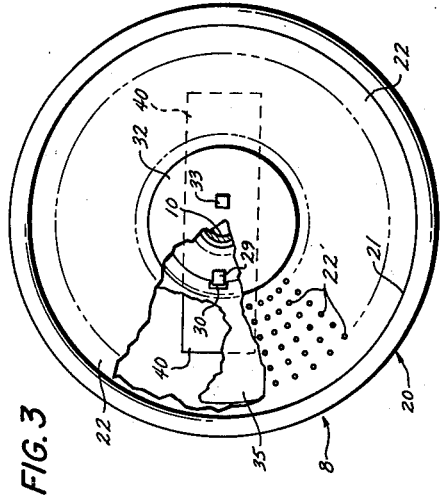
FIG. 3 is a top plan view partially broken away of the assembly of FIG. 2.

As seen in FIG. 1, an annular closure plate 35 underlies the basket floor 22 and is restrained in surface-to-surface contact therewith by a temperature sensitive bi-metal strip 40 apertured centrally, as seen in FIG. 2, to receive the lower tube segment 9 upon which it is mounted adjacent the upper edge of the bushing 11 where it may be secured if so desired. The strip 40 is arcuately shaped at ambient temperatures and faces concavely upwardly with its outer edges pressing upwardly against the under surface of the closure plate 35. As seen in FIG. 3, the plate 35 overlies and closes the perforations 22' of the floor 22 and although some of the liquid within the basket may seep through the perforations 22' and outboard of the plate 35, substantially all of the liquid volume will be restrained within the basket 20 until released by the lowering of the plate 35.

To this end, the inner circular edge of the annular plate 35 is dimensioned to move freely up and down along the outer vertical surfaces of the lower tube segment 9. When water is pumped upwardly through the tube 6 and lower and upper tube segments 9 and 10 to the radial ports 34 where it is deflected into the basket 20, the water and the instant coffee grounds mix and react to form a concentrate of instant coffee brew, as previously described. Meanwhile, the heat transferred to the basket assembly 8 by the water which is heated while being pumped, increases to the point where the bi-metal strip 40 deflects into the horizontal disposition shown in FIG. 2. The plate 35 will thereby be lowered and the instant coffee concentrate will then be permitted unrestricted discharge through the floor perforations 22' into the receptacle H where it will readily mix and recirculate with the remainder of the water. Instant coffe material which may not have fully dissolved at this point will be restrained slightly around the perforations 22' where they will eventually dissolve with the continued circulation of liquid therethrough.

Upon cooling of the basket assembly 8, bi-metal strip 40 and plate 35 will automatically reset for the next brewing operation in that the bi-metal strip will deflect to its FIG. 1 position to again dispose the plate 35 in surface-to-surface contact with the basket floor 22.

It is now seen that a coffee basket assembly embodying the present invention is economically manufactured, durable and easy to use; is readily inserted within a conventional coffee percolator pot or brew receptacle for converting the same for instant coffee brewing. A basket assembly embodying the invention automatically retains and stirs water and instant coffee grounds and discharges the same as an instant coffee concentrate. Furthermore, the assembly automatically resets itself for the next brewing operation.

As will be apparent to persons skilled in the art, various modifications and adaptations of the structure above described will become readily apparent without departure from the spirit and scope of the invention, the scope of which is defined in the appended claims.

I claim:

1. An instant coffee basket assembly comprising a basket having a floor with a plurality of apertures therethrough and an opening for receiving a fountain tube, a closure member, means supporting said closure member for movement into and out of engagement with said floor to close and open said apertures, and temperature responsive actuator means supported on the assembly, said temperature responsive actuator means being positioned and dimensioned to move said closure member into engagement with the basket floor to close the apertures therein upon decrease in temperature of said actuator means.

2. An instant coffee basket assembly for use in a percolator coffee maker, or the like, comprising a fountain tube for conveying liquid and having inlet and outlet ports, a basket mounted on said fountain tube and having a floor with a plurality of apertures therethrough, the outlet port of said fountain tube being positioned to discharge liquid into the basket, a closure member mounted on said fountain tube for movement into and out of engagement with said floor to close and open said apertures, and temperature responsive actuator means supported on the assembly, said temperature responsive actuator means being positioned and dimensioned to move said closure member into engagement with the basket floor to close the apertures therein upon decrease in temperature of said actuator means.

3. An instant coffee basket assembly comprising, a basket having a floor with a plurality of apertures therethrough, a closure plate dimensioned to close said apertures in the floor, means supporting said closure plate for movement into and out of engagement with said floor, temperature sensitive actuator means including a bi-metal strip supported on the assembly for moving said closure plate into engagement with said floor upon cooling of said strip, and for causing movement of said closure plate away from said floor upon heating of said strip.

4. An instant coffee basket assembly for use in a percolator coffee maker, or the like, said assembly comprising, a fountain tube, a basket mounted on said fountain tube and having a floor with a plurality of apertures therethrough, a closure plate dimensioned to close said apertures and mounted on said fountain tube for movement into and out of engagement with said floor, temperature sensitive actuator means including a bi-metal strip supported on the assembly for moving said closure plate into engagement with said floor upon cooling of said strip, and for causing movement of said closure plate away from said floor upon heating of said strip.

5. An instant coffee basket assembly for use in a percolator coffee maker, or the like, said assembly comprising, a fountain tube, a basket mounted on said fountain tube and having an apertured floor, said fountain tube extending upwardly within said basket and terminating adjacent the upper edge thereof, a conical deflector plate opening downwardly and supported adjacent the upper edge of said fountain tube, said tube providing radially oriented liquid ports underlying said reflector plate, a closure member mounted on said mountain tube for movement into and out of engagement with said floor to close and open said aperture, and temperature sensitive means mounted on the assembly, said temperature sensitive means being operative upon decrease in temperature thereof to move said closure member into engagement with the basket floor to close the aperture therein.

6. An instant coffee basket assembly for use in a percolator coffee maker, or the like, said assembly comprising, a fountain tube, a basket mounted on said fountain tube and having a perforated floor, said fountain tube extending upwardly within said basket and terminating adjacent the upper edge thereof, a conical deflector plate opening downwardly and supported adjacent the upper edge of said fountain tube, said tube providing radially oriented liquid ports underlying said deflector plate, a closure plate dimensioned to close said perforated floor and mounted on said fountain tube for movement into and out of engagement upon said perforated floor, temperature sensitive means supported on the assembly and operative when cooled to move said closure plate into engagement with said perforated floor, said temperature sensitive means being operative when heated to permit movement of said closure plate away from said perforated floor.

7. An instant coffee basket assembly for use in a percolator coffee maker, or the like, said assembly comprising, a fountain tube, a basket mounted on said fountain tube and having an apertured floor, a closure member mounted on said fountain tube for movement into and out of engagement with said floor to close and open said aperture, a bi-metal strip having a mounting aperture therethrough, means retaining said bi-metal strip adjacent its mounting aperture on said fountain tube, the ends of said bi-metal strip extending when cooled to move said closure member into engagement with said floor.

8. An instant coffee basket assembly for use in a percolator coffee maker, or the like, said assembly comprising, a fountain tube, a basket mounted on said fountain tube and having a perforated floor, a closure plate dimensioned to close said perforated floor and mounted on said fountain tube for movement into and out of engagement with said perforated floor, a bi-metal strip having a mounting aperture therethrough, means retaining said bi-metal strip adjacent its mounting aperture on said fountain tube, the ends of said bi-metal strip extending when cooled to move said closure member into engagement said perforated floor.

9. An instant coffee basket assembly for use in a coffee percolator, or the like, said assembly comprising, a fountain tube, a basket mounted on said fountain tube and having a perforated floor, said fountain tube extending upwardly with said basket and terminating adjacent the upper edge thereof, a conical deflector plate opening downwardly and supported adjacent the upper edge of said tube, said tube providing radially oriented liquid ports underlying said deflector plate, a closure plate underlying said perforated floor and dimensioned to close the same, said closure plate being mounted on said fountain tube for movement into and out of engagement with said perforated floor, a bi-metal strip underlying said closure plate and having an aperture centrally disposed therein, means retaining said bi-metal strip adjacent said aperture on said fountain tube, the ends of said bi-metal strip extending when cooled to move said closure plate into engagement with said perforated floor, said bi-metal strip being flexible when heated to permit movement of said closure plate away from said perforated floor.

References Cited in the file of this patent

UNITED STATES PATENTS 2,698,022    Fahnoe _____ Dec. 28, 1954

FOREIGN PATENTS 372,554    France _____ Feb. 21, 1907
445,965    Italy _____ Mar. 4, 1949